United States Patent [19]

Ko

[11] Patent Number: 5,126,946
[45] Date of Patent: Jun. 30, 1992

[54] ULTRASONIC EDGE DETECTOR

[75] Inventor: Wen H. Ko, Cleveland Heights, Ohio

[73] Assignee: The North American Manufacturing Company, Cleveland, Ohio

[21] Appl. No.: 611,771

[22] Filed: Nov. 13, 1990

[51] Int. Cl.$^5$ .............................................. G06G 7/66
[52] U.S. Cl. ...................................... 364/469; 226/15; 226/18; 364/550; 73/159; 73/599
[58] Field of Search ............... 73/596, 597, 602, 599, 73/609, 610, 611, 612, 104, 159; 226/15, 18, 19, 21; 364/468, 469, 550, 563; 367/118; 318/652

[56] References Cited

U.S. PATENT DOCUMENTS

| | | | |
|---|---|---|---|
| 3,225,988 | 12/1965 | Drenning | 73/599 |
| 3,342,284 | 9/1967 | Baird | 73/159 |
| 3,500,301 | 3/1970 | Meier | 367/93 |
| 3,528,145 | 9/1970 | Troope | 73/159 |
| 3,570,624 | 3/1971 | O'Connor | 73/159 |
| 3,771,114 | 11/1973 | Buchan | 367/89 |
| 4,291,577 | 9/1981 | Baum | 73/597 |
| 4,332,316 | 5/1982 | Berntsen | 367/7 |
| 4,335,603 | 6/1982 | Locke | 73/159 |
| 4,353,256 | 10/1982 | Moorey | 73/597 |
| 4,366,712 | 1/1983 | Bathmann | 73/600 |
| 4,368,438 | 1/1983 | Stienstra | 73/159 |
| 4,437,619 | 3/1984 | Cary | 242/75.51 |
| 4,446,735 | 5/1984 | Weilacher | 73/597 |
| 4,493,065 | 1/1985 | Sword | 367/96 |
| 4,574,194 | 3/1986 | Coats | 250/308 |
| 4,587,849 | 5/1986 | Gross | 73/644 |
| 4,608,674 | 8/1986 | Guscott | 367/93 |
| 4,648,539 | 3/1987 | Dingerkus | 226/19 |
| 4,688,423 | 8/1987 | Orkosalo | 73/159 |
| 4,721,902 | 1/1988 | Tellerman et al. | 73/610 |
| 4,730,492 | 3/1988 | Burk | 73/597 |
| 4,817,424 | 4/1989 | Pellatiro | 73/159 |
| 4,835,519 | 5/1989 | Suzaki | 340/538 |
| 5,000,032 | 3/1991 | Nakashima et al. | 73/37.6 |
| 5,072,414 | 12/1991 | Buisker et al. | 364/550 |

FOREIGN PATENT DOCUMENTS 2107063 12/1978 Fed. Rep. of Germany ........ 73/610

Primary Examiner—Hezron E. Williams
Assistant Examiner—Rose M. Finley
Attorney, Agent, or Firm—Body, Vickers & Daniels

[57] ABSTRACT

A system for creating a control signal having a value indicative of the position of the lateral edge of a moving web wherein the system creates a succession of ultrasonic pulses from a transmitter, each of the pulses being created at a known transmit time in response to a transmit signal with the pulses each having a number of oscillations defining a pulse envelope having a pulse start portion. The system directs the ultrasonic pulses toward an ultrasonic receiver along a selected path whereby the position of the lateral edge of the web in the path determines the energy of the pulse as it is received by the receiver and converts the received pulse into an electronic signal having an amplitude determined by the energy of the received pulse. The receiver is spaced from the transmitter a predetermined distance causing the pulses to be received by the receiver at a given time after the transmit signals for a given ambient temperature. The system includes the function of creating a logic window having a given time-based length and occurring at a set time after the transmit signal with the set time being slightly less than the given time whereby each of the electronic signals occurs at an offset time in the logic window and the function for controlling the value of the control signal by the amplitude of the electrical signal.

34 Claims, 7 Drawing Sheets

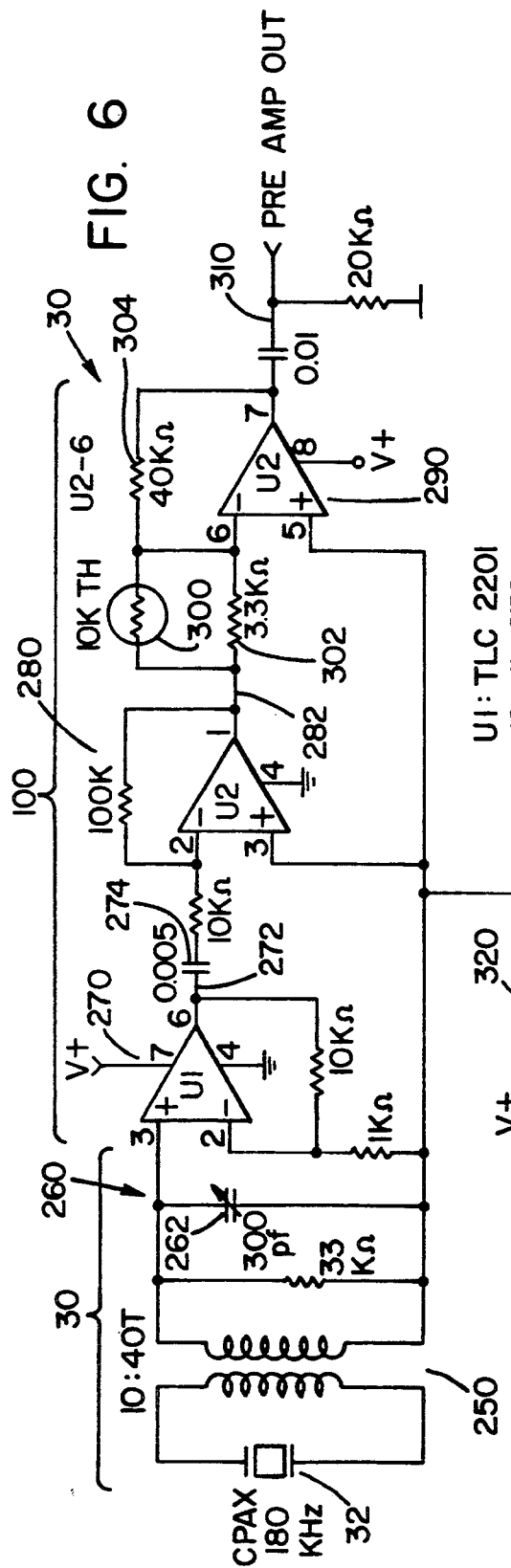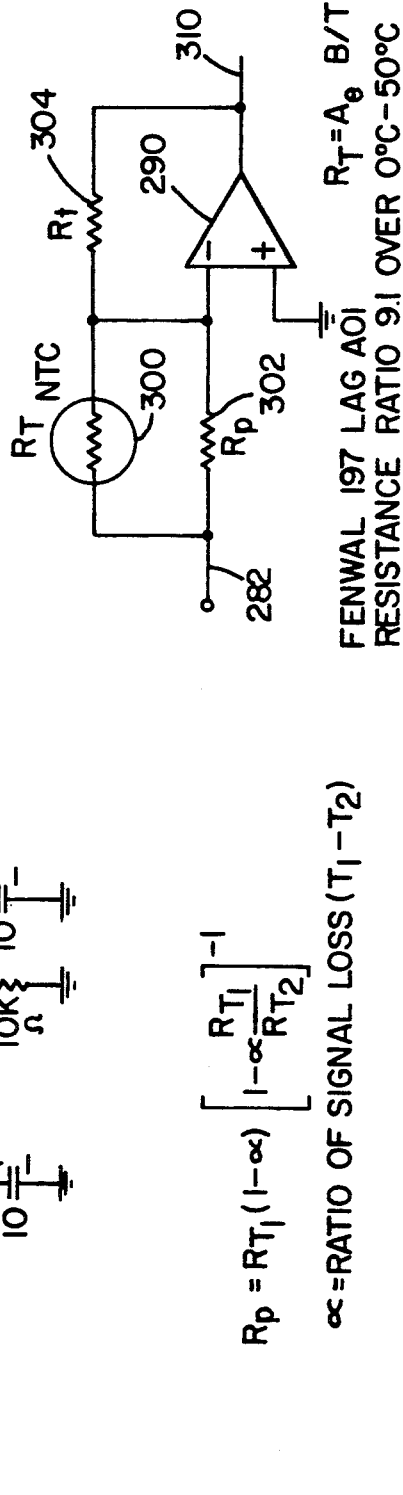

ULTRASONIC EDGE DETECTOR

DISCLOSURE

This invention relates to the art of guiding a strip, or web, as it is moving along a preselected path and more particularly to an improved ultrasonic edge detector system for detecting the position of the lateral edge of the strip or web as it moves along a selected path for the purpose of creating a control signal to correct the position of the lateral edge of the moving web or strip.

The invention has particular application to creation of a movement correcting control signal determined by the position of the lateral edge of a moving web and it will be described with particular reference thereto; however, it is appreciated that the invention has broader applications and may be used for creating a control signal indicative of the position of the lateral edge of a moving web for various purposes.

When processing web material or strip material, such as fabric, steel sheet, plastic film, etc., the web passes along a preselected feed path between processing operations. It is essential that the web or strip maintains its centered position as it moves through the processing equipment. A substantial amount of time and development effort has been devoted to maintaining the position of the moving strip as it is being processed. One of the more common arrangements for accomplishing this task is the provision of a device to detect the lateral edge of the moving strip and to use this detected position for creating a control signal which control signal is used in a feedback or servo system for correcting the position of the moving web. As the web tends to drift from its centered position, a control signal communicates with the corrective mechanism through a corrective feedback or servo mechanism. The amount of corrective action taken by the feedback mechanism or servo positioning device may be controlled by the magnitude of the feedback signal, which magnitude is determined by the deviation magnitude of the lateral edge from a preselected centered or control position. By employing an increased corrective action as the magnitude of the deviation increases, a relatively rapid and efficient arrangement is provided for maintaining the web or strip in its preselected position. It is possible to employ a concept wherein a digital signal is provided indicating the magnitude of a displacement of the strip from the desired position and an indication of the direction of the deviation. Such a system can be used; however, if the digital signal is too course, i.e. too few levels or too few digits, there is a tendency for this type of system to experience increased hunting. Consequently, the present invention uses the concept where the magnitude of the feedback control signal varies with the amount of lateral displacement of the strip. This type system is preferred and is employed in describing the present invention; however, it is not intended that the invention is limited to an analog feedback concept. A digital feedback is also possible. Variable magnitude output control signals and digital corrective output control signals are considered to be equivalent for the purposes of practicing the present invention.

Early attempts to provide a feedback control signal indicative of the lateral position of the web involved mechanical feelers or limit switches. The disadvantages of these mechanical devices are legion in the art. Physical contact with the strip is undesirable due to friction, wear, interference with the strip, distortion of the strip, lack of accuracy and other obvious deficiencies. To overcome the difficulties associated with detectors physically contacting the moving strip, many systems were developed for non-contact edge detection. One successful effort in this area involved transmitted light responsive detectors. A light beam was transmitted to a photosensitive receiver. As the edge of the strip blocked the light, the edge could be detected. These systems were not successful for transparent strip and were affected seriously by ambient light. To overcome these difficulties, pulsating light detectors were developed and were successfully employed throughout the industry. However, light detectors still were not successful for transparent webs and in cloudy environments. As an alternative to the light emitting edge detectors, ultrasonic detecting systems were developed and suggested for the edge of the strip. These ultrasonic detecting systems had an advantage. They could create a proportional signal quite easily determined by the amount of energy received from an ultrasonic transducer. As the strip shifted outwardly, more of the signal was blocked and the energy decreased. These ultrasonic edge detectors are now considered as advantageous edge detectors for moving web or strip. As the position of the lateral edge of a strip changes, the amount of energy at the receiver changes somewhat proportionally. This feature gives a proportional feedback signal for the mechanical correction of the moving strip. These ultrasonic detectors, with their obvious advantages over previous edge detectors, have certain disadvantages. The most common arrangement of ultrasonic edge detectors involves the transmission of a continuous ultrasonic signal from the transmitter to the receiver. The energy at the receiver is controlled by the amount of shielding caused by the lateral edge of the moving web. The continuous ultrasonic wave when reflected by the receiving unit will set up a standing wave, which will modify the signal received depending upon the "y" direction position of the web. See FIG. 1. Therefore, the continuous ultrasonic signal introduces severe noise or uncertainty in the "x" direction, the direction of interest. To reduce the amount of noise in such a system, it has been suggested to create a series of ultrasonic pulses created by gating oscillations from an oscillator to a piezoelectric transducer. When the pulses are narrow, or short, the transmitted wave reaches the transmitter transducer and are not reflected to give a standing wave effect. These pulses are used much like light pulses to provide discrete transmissions of energy. These systems have had temperature compensation problems.

THE INVENTION

To improve response, the transmitter and receiver of a pulsed ultrasonic detector for use on an edge control system are spaced such that the receiver is activated at a preselected time after the pulse has been transmitted. Thus, the receiver only responds to the transmitted ultrasonic pulse itself. This reduces the noise in the system. The amount of energy created during the receiving window is integrated to create the controlled output signal. The oscillator of the system is driven by a preselected number of pulses from a transducer or, in accordance with another aspect of the invention, the ultrasonic pulse is created by ringing a transducer by an electric pulse. These two concepts each produce a series of ultrasonic transmitted pulses each having a given frequency and a certain number of effective cycles. The transmitted pulses are passed to the receiver wherein a receiving window is activated to receive the energy from the pulse as it is received by the transducer of the receiver. As the edge of the strip shifts to shield more of the path between the receiver and the transmitter, the energy received from the pulses during successive windows decreases. As the strip moves in the opposite direction to shield less of the path, the energy received during the windows increases. This change in received energy produces an analog output signal indicative of the position of the lateral edge of the moving strip. Ambient temperature and humidity substantially changes the amount of transmitted energy. This concept of pulses received by discriminating windows is novel in edge detector systems for controlling the position of strip material and results in a non contact system that is highly accurate. However, the output signal can experience a slight shift caused by changes in ambient temperature in the space between the transmitting transducer and the receiving transducer. The velocity of the transmitted signal increases with increases in the ambient temperature so that the signal received and the receiving window are not synchronized. The pulse may come slightly before or after the logic window controlling the passage of energy to the integrating circuit.

The present invention also contemplates various improvements in the basic concept of pulses received by discriminating logic windows to increase the accuracy of the output control signal as the ambient temperature experienced by the system changes.

In accordance with one aspect of the temperature compensation of the present invention, a transmitter using an oscillator driven transducer to transmit the ultrasonic pulses is replaced by a transmitter wherein a voltage pulse is applied to the transducer and the transducer is allowed to ring at its natural frequency. Consequently, as ambient temperature changes, the change in the natural frequency of the transducer used as the transmitter does not decrease the efficiency of the transmitted signal which is the case when a fixed frequency oscillator is gated to the transmitting transducer to create a fixed frequency output pulse from the transmitter. Application of a voltage signal to the transducer for transmitting a ringing pulse at the natural frequency of the transmit transducer is possible in an ultrasonic edge detector since the object of the system is not to detect distance but to detect how much energy is transmitted to the receiver. Distance detection would require controlled detection of a particular cycle in the transmitted signal or in the echo thereof. In a system of the type to which the present invention is directed, the received energy created by each ultrasonic pulse is used to control the output control signal. Consequently, it has been found that the natural frequency of a ringing transducer can be employed for this particular type of detecting system. In this aspect of the invention, the efficiency of transmitting is maintained irrespective of deviations in the ambient temperature. This is an improvement over other edge detectors that direct energy pulses past the strip edge; however, the use of a fixed oscillating transducer for creating the series of transmitted pulses can also be employed with a system using other aspects of the present invention to be hereinafter described. Consequently, an aspect of the invention is in the transmitted concept for an ultrasonic edge detector which has the advantages explained above; however, the receiving aspect of the present invention can be used with both the improved transmitting concept using a ringing pulse and with the concept wherein an oscillator drives a transducer at a fixed frequency for a known number of cycles to create the transmitted ultrasonic pulse.

The present invention can be defined as a system for creating a controlled signal having a value indicative of the position of the lateral edge of the moving web. The system comprises means for creating a succession of ultrasonic pulses from a transmitter, each of the pulses being created at a known transmit time. In the preferred embodiment the pulse is in response to a short transmit signal that rings a transmitter at its natural frequency. In an alternative embodiment the pulse is created by gating oscillations to drive the transmitter. The pulses irrespective of the means of creation each have a number of cycles defining a pulse envelope. The ring created pulse has a pulse start portion and a decaying following portion. The system includes means for directing these ultrasonic pulses toward an ultrasonic receiver along a selected path. The position of the lateral edge of the web in the path of the ultrasonic pulses determines the energy of the pulse received by the receiver. The received pulses are each converted into an electrical signal having an amplitude determined by the energy of the received pulse. By spacing the receiver from the transmitter a set distance each ultrasonic pulse is received by the receiver at a given time after the transmit signal for a given ambient temperature. A circuit creates a logic window having a given time-base length at a given time in relation to the transmit time so that the window and electrical signal can be added logically whereby each of the electrical signals which occurs in a logic window is passed to an integrator or other processing circuit so the value of the control signal can be determined by the amplitude of electrical signals passing through the windows. This value is indicative of the energy of the received pulses.

The next aspect of the present invention is the control of the logic receiving windows in the receiving network to compensate for ambient temperature changes. In accordance with the first arrangement to modify the logic windows, the logic windows in the receiving network starts at a set time after the transmit signal and ends before the pulse train or envelope ends. The set time is controlled by the circuit to be slightly less than the given time for the transmitted pulse to impinge upon the receiver. Consequently, the electrical signal created in the receiver by the transmitted ultrasonic pulse starts at an offset time in the logic window at a given ambient temperature. In practice, this time offset is in the range of 10-30 microseconds for 25° C. The logic window opens or is receptive for an electrical signal before a transmitted signal is received at 25° C. By employing this invention, as the temperature increases, the velocity of the transmitted pulse increases and a greater amount of the electrical signal created by the transmit pulse appears during the logic receiving window. Thus, as the ambient temperature increases, a larger proportion of the signal is directed to the integrator of the receiving network so that the perceived energy of the received ultrasonic pulse is slightly higher as the temperature increases. At the same time, the increased temperature reduces the transmit and the receiving transducer efficiencies, and reduces the amplitude of the signal created by the ultrasonic pulses. Thus the energy per pulse is reduced. These two phenomena offset each other so that the detected energy for a given strip position creates an output control signal having nearly the same value with increases in ambient temperature. The reverse actions of these two phenomena occur when the temperature decreases.

In accordance with another embodiment of the invention, a thermistor is employed in the receiving network to increase the length of the logic window as the ambient temperature at the receiver increases. As the temperature decreases, the length of the logic window decreases. These two arrangements for modifying the effect of the logic windows by temperature can be combined to modify the measured energy as the ambient temperature changes, such that the net signal is nearly constant with temperature change.

In accordance with another embodiment of this aspect of the invention, a thermistor is employed in the circuit comprising the receiving preamplifier stage. By using a negative temperature coefficient thermistor in a stage of the preamplifier, the gain of this stage of the preamplifier can be increased as the temperature increases. Again, this can be coordinated so that the energy integrated during each logic window of the receiving network can have more impact as the ambient temperature increases. This again compensates for the ambient temperature changes of the ultrasonic system. In accordance with a more limited aspect of this embodiment of the present invention, the temperature compensating thermistor employed in a preamplifier stage is mounted directly onto the transducer constituting the receiver of the ultrasonic system. In using this feature, the transducer may be insulated from its metal mounting housing by a layer of acoustically and thermally isolating material such as silicon rubber. Consequently, the ambient temperature of the receiving transducer onto which the thermistor is mounted has a reduced hysteresis and follows the transducer temperature without the frame creating a heat sink. The layer, which may be foam or sponge, prevents any mechanical, acoustical coupling between the transducer and its support frame. In this manner, the thermistor temperature follows more closely the temperature of the receiving transducer and not the temperature of the housing mounting the transducer forming the receiver.

These various modifications of the receiving network or system used in the ultrasonic edge detector tend to compensate for variations in the ambient temperature and can be employed in an ultrasonic edge detector system using an oscillator driven transducer, normally piezoelectric, or in the improved transmitting concept contemplated as one aspect of the present invention wherein the piezoelectric transducer is caused to ring at its fixed frequency in response to a transmit signal.

The primary object of the present invention is the provision of an improved ultrasonic strip edge detector and method of using the same, which detector and method has a reduced tendency to drift with ambient temperature.

Yet another object of the present invention is the provision of an edge detector and method, as defined above, which detector and method employ a relatively inexpensive transducer for the transmitter and receiver, while maintaining temperature compensation for variations in the ambient temperature.

Still a further object of the present invention is the provision of an edge detector and method, as defined above, which edge detector and method have a transmitting concept which maintains its efficiency as ambient temperature of the transmitting transducer changes the natural frequency of the transmitting transducer.

Yet another object of the present invention is the provision of an edge detector and method, as defined above, which edge detector and method employ a thermistor mounted directly upon the receiving transducer for the purposes of compensating for changes in the ambient temperature to which the detector is exposed.

Still a further object of the present invention is the provision of an edge detector and method, as defined above, which edge detector and method employ a ringing concept for the transducer that creates the transmitted ultrasonic pulses.

Another object of the present invention is the provision of a detector and method, as defined above, which detector and method use a pulsed transmitter and logic windows so that no standing wave is created and the noise is reduced when measuring the amount of energy transmitted past the edge of the moving strip.

These and other objects and advantages will become apparent from the following description taken together with the accompanying drawings.

BRIEF DESCRIPTION OF THE DRAWINGS

FIG. 6 is a wiring diagram of the preferred embodiment of the preamplifier in the receiving network of the preferred embodiment of the present invention;

FIG. 6A is a portion of the wiring diagram illustrating one stage of the preamplifier shown in FIG. 6 with mathematical relationships for selecting certain circuit components in accordance with the preferred embodiment of the present invention;

PREFERRED EMBODIMENTS OF THE INVENTION

Figure 2:
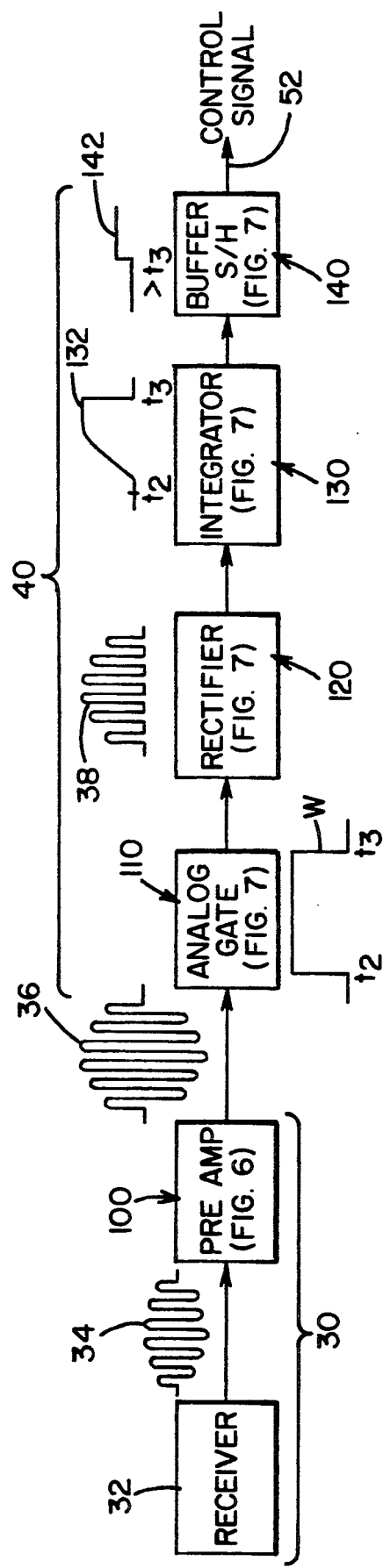
FIG. 2 is a block diagram showing elements of the receiving network of an edge detecting system as shown in FIG. 1.
Figure 9:
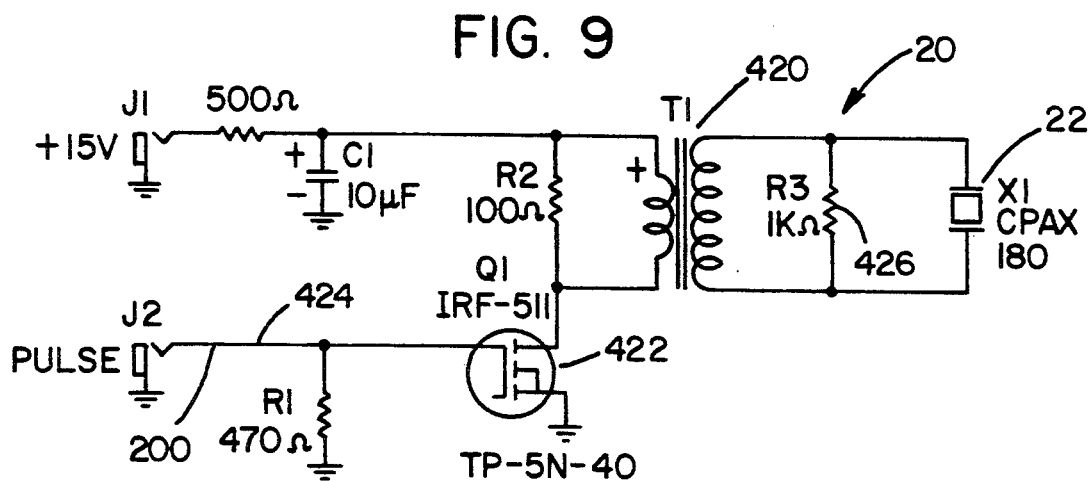
FIG. 9 is a wiring diagram illustrating the transmit signal employed in accordance with the preferred embodiment of the present invention.

Referring now to the drawings wherein the showings are for the purposes of illustrating preferred embodiments of the invention only and not for the purpose of limiting same, FIG. 2 discloses a system A for creating an output signal proportional to the position of the lateral edge 10 of strip B as it moves along a path P generally perpendicular to the illustration. System A includes a transmitter 20, the preferred example of which is shown in FIG. 9. A piezoelectric transducer 22 is used for creating an ultrasonic signal US which is an acoustical pressure wave having sinusoidal oscillations at generally the natural frequency of the piezoelectric ceramic transducer 22. Ultrasonic signal US is directed along path P past the edge 10 of strip B toward receiver 30, best shown in FIG. 6. The receiver also employs a piezoelectric transducer 32. A control network 40, shown in more detail in FIG. 7, controls the transmitted ultrasonic signal from transducer 22 and processes this signal as it is received by transducer 32 of receiver 30. This process results in a control signal 52 having a value indicative of the edge position for controlling a mechanical feedback system illustrated as position servo 50 to correct the edge position. In accordance with the preferred embodiment of the invention, the voltage on line 52 determines the magnitude and direction of correction by servo 50 to reposition edge 10 in path P in a feedback or servo network arrangement. Of course, the analog nature of the signal in line 52 could be digitized to produce a digital signal loaded in parallel or series to control the rate and direction of correction caused by the mechanical arrangement illustrated schematically as position servo 50. In accordance with the invention, the corrective or error signal in line 52 could be either a yes or no logic indicating whether a position correction should be made. This control concept would involve a threshold detector which is not used in accordance with the present invention but this control arrangement is an equivalent concept which would employ the inventive aspects of the present invention.

As lateral edge 10 shields more of ultrasonic signal US, less energy impinges upon transducer 32. The amount of energy impinging upon the transducer is converted into the value or magnitude of the control signal in line 52. This control signal moves strip 10 in a corrective direction.

The block diagram illustrated in FIG. 2 shows generally the processing scheme employed in control network 40 to determine the energy from signal US which is detected by transducer 32. The acoustical oscillating pressure wave forming ultrasonic signal US is in the form of a series of discrete pulses, each having a number of sinusoidal oscillations. This type wave is standard ultrasonic detection technology. These pulses formed from acoustical oscillation travel along path P and are received by the transducer 32. Network 40 converts each transmitted pulse into an electrical signal 34 generally matching the transmitted pulse which is one of a series of such pulses constituting ultrasonic signal US. It is possible to provide a pass band filter to allow only transmission of the portions of electrical signal 34 having a certain frequency. The transducer 32 can be tuned to give this pass band discrimination. In practice, the passed frequency is in the general range of 180 KHz. This is an example. The frequency can be between 20–300 KHz. Electrical signal 34 is then amplified by a preamplifier 100, shown in detail in FIG. 6. This amplifier produces an increased amplitude electrical signal schematically represented as sinusoidal signal 36. Signal 36 is then passed through an analog gating circuit 110 producing a logic window W having a preselected length. Gate 110 is illustrated in detail in FIG. 7. Electrical signals, such as voltage signal 36, can pass through gate circuit 110 only when logic window W is in existence. The output of gate 110, which functions generally like an AND gate, is then rectified by half wave or full wave rectifier 120 shown in detail in FIG. 7 also. This produces a rectified electrical signal 38 which is directed to an integrator 130, also shown in detail in FIG. 7 which produces a signal 132 between times $t_2$–$t_3$ which is the time based length of signal W. This integrated signal is directed to a sample and hold network with an output buffer illustrated as block 140 and shown in detail in FIG. 7. The output signal 142 is the voltage level on line 52 to produce the feedback control for system A. As an acoustical pulse is received, it is converted to an electrical pulse 34 which may be passed through a pass band filter. This signal is amplified, rectified, integrated and then used to control the voltage level on the sample and hold circuit 140.

Figure 3:
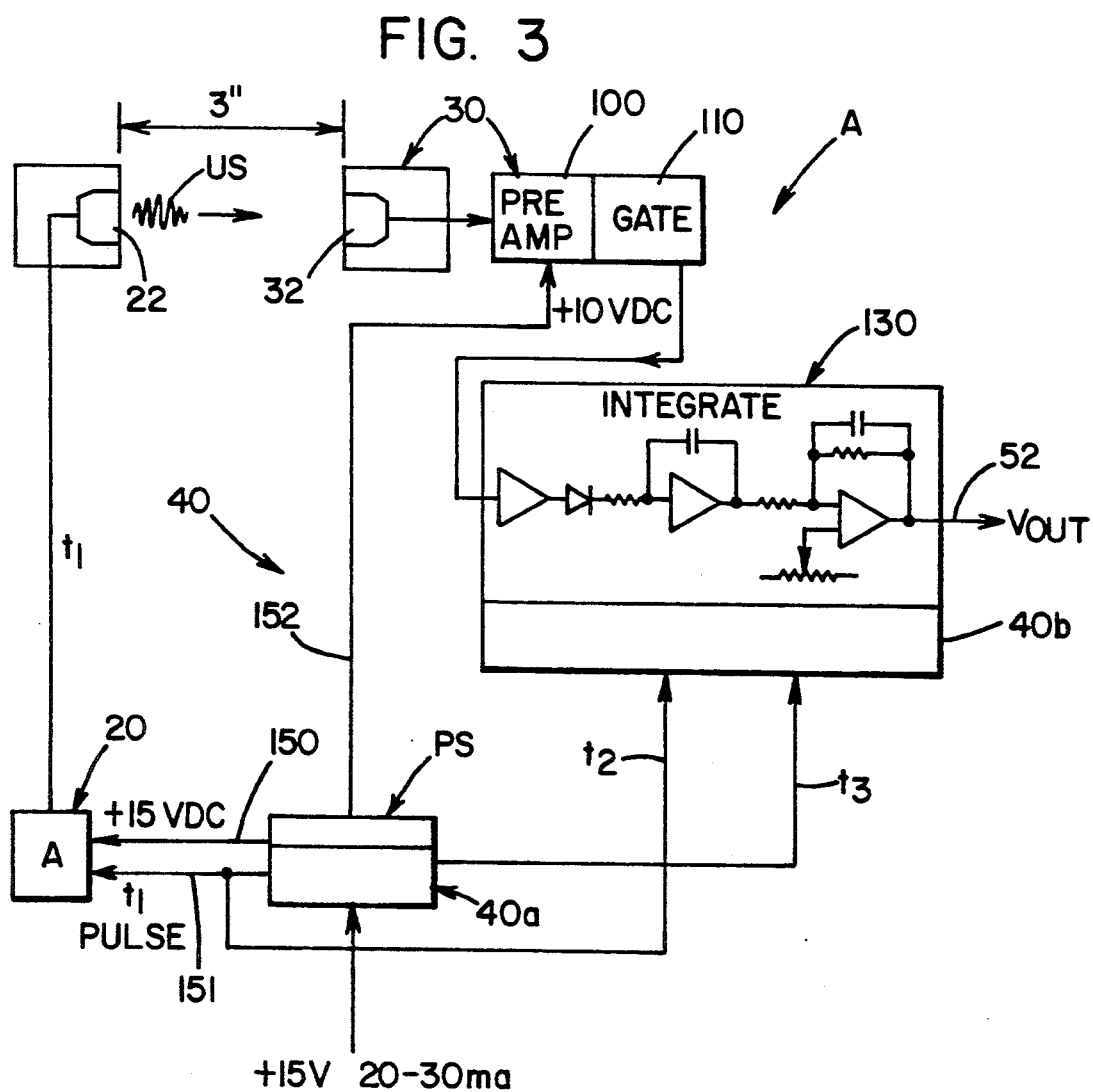
FIG. 3 is a combination layout and wiring diagram of an edge detector system as shown in FIG. 1 and using the receiving network concepts as shown in FIG. 2.
Figure 4:
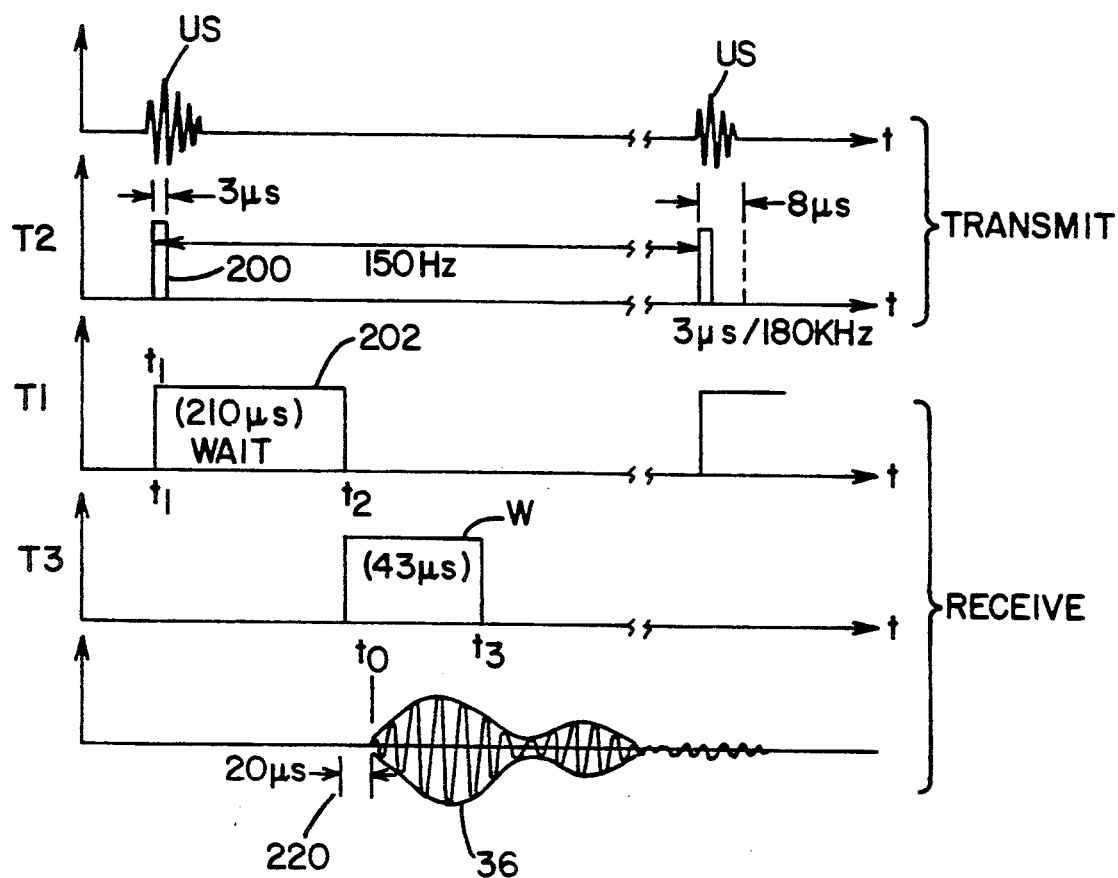
FIG. 4 are timing diagrams illustrating certain time relationships of the present invention.
Figure 5:
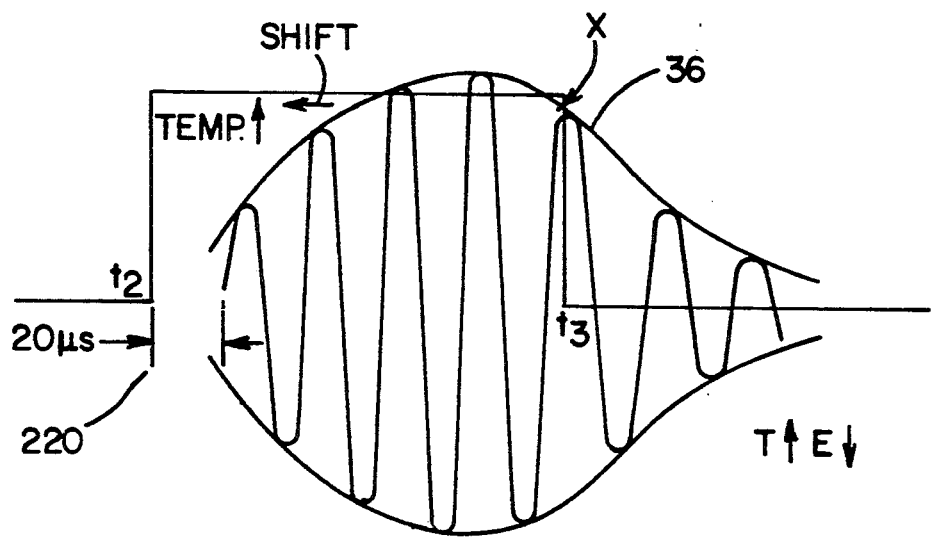
FIG. 5 is an enlarged pulse concept combining two features shown in FIG. 4 to explain certain aspects of the present invention.

FIG. 3 is schematic view of system A wherein like numbers are for like parts. In this view, the power supply PS produces on line 150 a 15 volt D.C. voltage for transmitter 20 and produces a 15 volt transmit signal at time $t_1$ on line 151. Transmit signal 200 is schematically illustrated in FIG. 4. This causes a transmitted signal US which is the pulse of oscillating acoustical disturbances. In the preferred embodiment of the invention, trigger pulse 200 is a 15 volt activating pulse which causes a ringing effect of transducer 22 at the natural frequency of the piezoelectric ceramic transducer 22. The trigger pulse 200 is relatively short in length, between 3–8 microseconds to produce a ringing effect. The width of pulse 200 is slightly greater than one-half the period of the natural frequency of the transmitter. At a natural frequency of about 180 KHz the pulse is 3.0 microseconds wide. This pulse occurs at a rate determined by control network 40. This rate is 150 Hz in accordance with the illustrated embodiment. Power supply line 152 directs 1–0 volts to preamplifier 100 and other components better illustrated in FIG. 2. A signal in line $t_3$ determines the length of window W. The distance between the trigger pulse 200 ($t_1$) and the start of window W ($t_2$) is a delay (WAIT) illustrated in FIG. 4 as pulse 202. This pulse is correlated with the spacing between transducer 22 and transducer 32 that sets the time for a pulse to travel from the transmitter at $t_1$ to the receiver at $t_2$. In accordance with a temperature compensation feature of the invention, the spacing of the two transducers and the length of the delay (WAIT) pulse 202 is such that there is an offset of 10–30 microseconds between time $t_1$ and $t_0$ when the initial portion of signal 36 is created under a known operation condition for a preselected temperature, such as 25° C. This offset 220 (between $t_2$ and $t_0$) is best illustrated in FIG. 5 and forms one aspect of the present invention. As the temperature in path P increases, the velocity of the ultrasonic pulses forming signal US increase; therefore, the electrical signals 36 occur earlier and progress to the left within window W. Thus, more energy is released through gate 110 for a given pulse, as the ambient temperature increases beyond the preselected temperature. The energy of each pulse decreases. The increase of cycles in logic window W compensated for the decreased pulse energy. This reduces the drift of the signal in line 52 merely due to temperature modified energy levels of the individual pulses forming signal US. When the temperature decreases the energy of the pulse increases. Electrical signal 36 automatically shifts to the right in FIGS. 4 and 5 since the velocity of the pulse decreases. Thus, a lesser number of cycles of the received signal passes through gate 110 to the integrator 130. As the ambient temperature increases, the amount of energy of each signal decreases; however, the invention compensates for this phenomena by integrating an additional number of cycles of signal 36 by passing a greater portion of the signal through gate 110. As the ambient temperature decreases, the energy of each pulse increases which increases the amplitude of the electrical signal 34; however, the signal 36 shifts to the right to integrate a lesser amount of the total received signal 34 as represented by amplified electrical signal 36. In accordance with this aspect of the invention, offset 220 is created between the start of window W at time $t_2$ and electrical signal 36 starting at time $t_0$. This offset ($t_2-t_0$) is for generally a nominal ambient temperature, such as 25° C. As the temperature increases, more of the weaker signal is integrated. As the ambient temperature decreases, less of the stronger received signal is integrated. This is a self compensating arrangement for use in an edge detector.

The amount of signal or envelope 36 in window W at the normal temperature of 25° C. is controlled by ending the window amplitude or point X of signal 36, as shown in FIG. 5. By knowing the shape of the envelope at 25° C., the end of the window at point X is determined to give a selected energy. As the temperature increases toward 60° C., offset 220 decreases and more of the envelope 36 exists during the window; however, the amplitude of the envelope decreases. This gives temperature compensation. The proportions are adjusted to the desired amount of compensation need.

A further aspect of the preferred embodiment of the present invention is illustrated in FIGS. 6 and 6A together with a general description of the receiver 30 and the preamplifier 100, as explained in connection with network 40 illustrated in FIG. 2. The receiving network or circuit 40 includes a transformer 250 having a gain of 4.0 which allows transmission of the electrical signals from transducer 32 to a pass band filter 260 with an increased signal, but little increase in the noise. Transducer 32 is a CPAX 180 which has a natural frequency of approximately 180 KHz and is tuned to produce the narrow range pass band filtering. The piezoelectric transducer 32 is oscillated by the incoming pulses of signal US. The oscillations of the transducer are at an amplitude determined by the energy of the incoming pulses. This energy is primarily dependent upon the position of edge 10 in path P. A slight change of energy is caused by ambient temperature change. The invention processes the pulse in a novel fashion and also provides features to adjust for temperature changes.

Pass band filter 260 has an adjustable capacitor 262 so that the pass band allows response to a preselected narrow frequency range, such as about 150-225 KHz. The output of the filter, which also includes the transducer, is directed to a first stage amplifier 270 having a gain of 11.0 and an output 272 applied to a coupling capacitor 274. At capacitor 274, the signal gain for the electrical signal 34 created by the incoming ultrasonic pulse is 44. A second stage amplifier 280 has an output line 282 directed to the input of a final stage amplifier 290. As so far explained, receiver 30 includes the transducer 32 and the multiple stage preamplifier 100. This circuit is employed for detecting the incoming signal and amplifying the signal before it is introduced to the logic gate 110 of control network 40.

In accordance with another aspect of the invention, one stage of the preamplifier 100, in this instance the final stage 290, is provided with a thermistor 300 having a negative temperature coefficient (NTC) and connected to adjust the gain of preamplifier 100 in accordance with the ambient temperature detected by thermistor 300. The thermistor is connected in parallel with a 3.3 Kilo ohms resistor 302 and in series with a 40 Kilo ohms resistor 304 to adjust the extent and linearity of the temperature compensation. Additional resistance in parallel will reduce the temperature compensation slope and make it more linear. This circuit produces an output in line 310 which is adjusted according to the ambient temperature sensed by the thermistor 300. In this manner, signal 36 as shown in FIGS. 4 and 5, has an amplitude which is controlled by the ambient temperature. This concept can be employed with the previously discussed feature of the invention wherein electrical signal 36 is normally offset from the start of the window W. Both of these features assist in temperature compensation. They may be used separately or together. At this time the thermistor concept is used by itself. In both of these aspects of the present invention, the ultrasonic signal US can either be a series of pulses caused by ringing of the transducer 22, which is the preferred embodiment of the present invention or an oscillator driven pulse used as an alternative transmit concept for an edge detector constructed in accordance with the invention. Both of these signals can be processed in accordance with the feature of the invention described in connection with FIG. 4 and FIG. 6.

The relationship of the thermistor with respect to parallel resistor 302 controls the tracking of the gain effected by the thermistor 300. FIG. 6A illustrates an equivalent circuit with the general mathematic relationship which applicant has found to be successful in accomplishing the tracking feature when using a 10 Kilo ohms FENWAL 197 LAG A01 thermistor. Other arrangements could be provided for incorporating a thermistor of a negative temperature coefficient in the preamplifier stage of receiver 30 for the purpose of compensating for ambient temperature changes in the area between transducers 22, 32. The input power circuit 320 is employed for driving the amplifiers 270, 280, and 290 which have the designation U1, U2 and U2, respectively.

Figure 7:
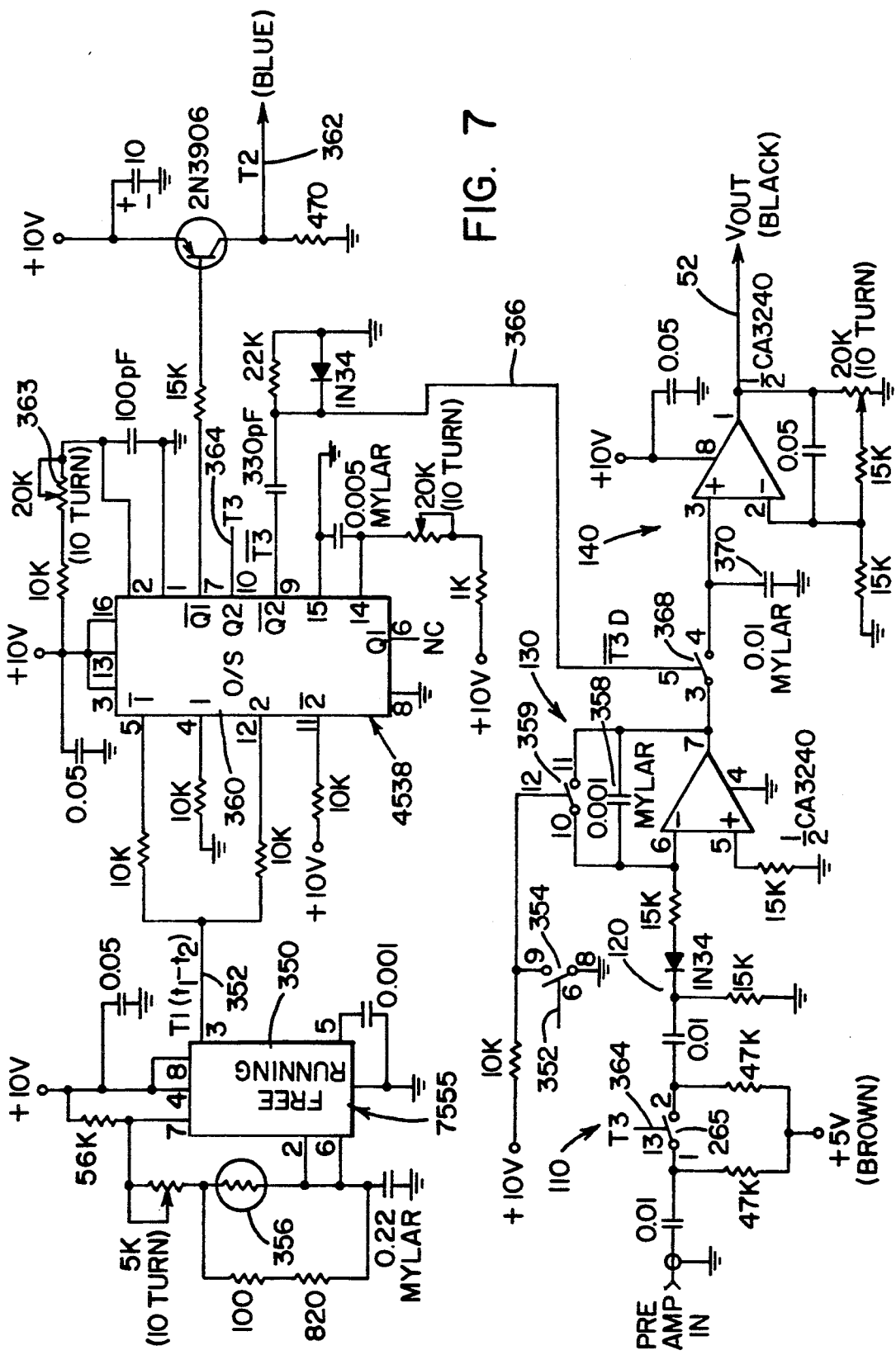
FIG. 7 is a wiring diagram showing the receiving network employed in the preferred embodiment of the present invention to accomplish the elements illustrated generally in FIG. 2.
Figure 8:
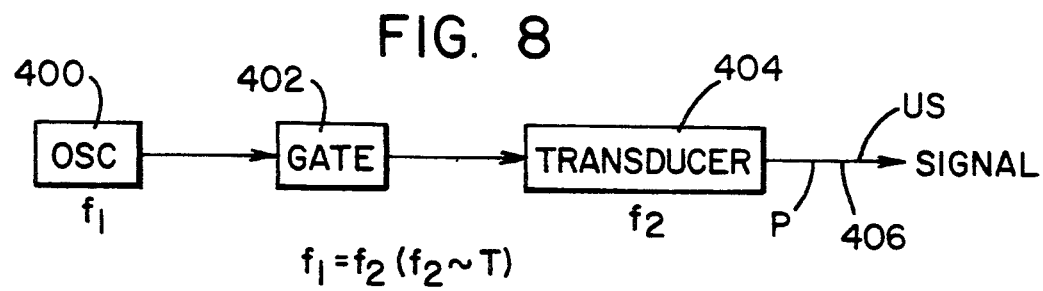
FIG. 8 is a schematic block diagram showing a first concept for creating a transmit ultrasonic pulse for the ultrasonic edge detector using certain aspects of the present invention.

Referring now to FIG. 7, the timing circuit employed in the preferred embodiment of the invention is illustrated. A free running oscillator 350 has a 150 Hz output in line 352 the leading edge of which is time $t_1$. The trailing edge of the logic on line 352 is time $t_2$. Logic "WAIT" switch 354 defines pulse 202 ($t_1$) which is the logic on line 352. Switches 354 and 359 are closed, during the time of WAIT pulse 202 ($t_1-t_2$) while logic one stays on line 352. The length of time for the logic on line 352 can be controlled, optionally, by thermistor 356 so that the length of a WAIT pulse 202 can be changed in accordance with the ambient temperature. Time $t_1$ remains the same. The spacing of time $t_2$ is coordinated with the ambient temperature to adjust the time of window W by the ambient temperature. This feature does not depend on the type of pulse transmitted or the other temperature compensating concepts. Each of these concepts can be used separately for temperature compensation. The logic on line 352 triggers a one shot device 360 to cause a trigger pulse 200 or $t_2$ in line 362. The width of the trigger pulse can be adjusted by resistor 363. In practice, this adjustment is between 3 microseconds and 8 microseconds. An output signal $T_3$ appears in line 364. The reverse of the $T_3$ logic on line 364 appears in line 366. The logic on line 364 closes gate 110 by logic switch 265. This switch is held closed to create the window pulse ($t_2$-$t_3$) shown in FIG. 4. When the logic is removed from line 364, switch 265 is opened and window W is terminated. Line 366 closes switch 368 a short time after window W has been terminated. In this manner, the output of integrator 130 for each processed ultrasonic pulse can be directed to the sample and hold circuit 140. When logic shifts on line 352, a trigger pulse 200 occurs on line 362. Switches 354 and 359 are closed to discharge capacitor 358 through switch 359. Consequently, the integrator 130 is reset. This condition remains during the preselected pulse 202. At that time, switch 359 is opened and logic appears in line 364 to initiate gate 110. This gate is held for the preselected time of window W ($t_2$-$t_3$). At that time, gate 110 is opened. Thereafter, the logic on line 366 shifts to open switch 368. This maintains the level of voltage on line 52 at a value controlled by the sample and hold network, including capacitor 370. In this manner, the pulses set forth in FIG. 4 can be created by network 40. Offset 220 ($t_2$-$t_0$) is controlled by the length of pulse 202 that determines time $t_2$. If pulse 202 is adjustable by temperature and the offset concept is employed, time $t_0$ is changed to maintain the spacing between times $t_2$ and $t_0$.

Figure 1:
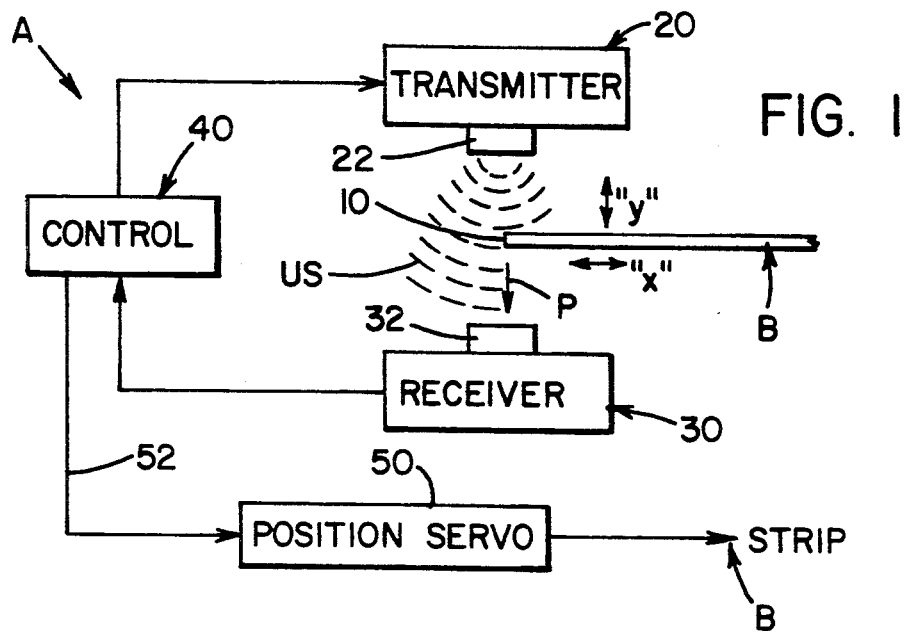
FIG. 1 is a schematic layout drawing of the system employing an ultrasonic edge detector for a moving strip or web on which the present invention is employed.
Figure 10:
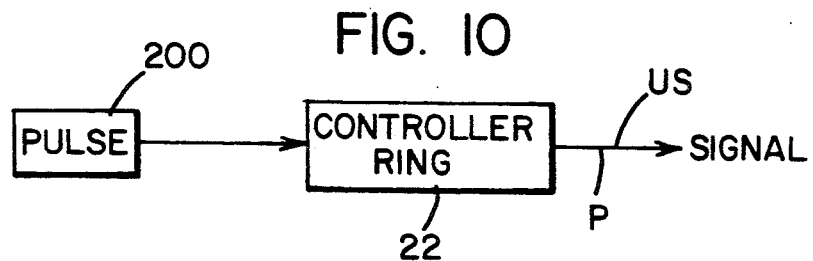
FIG. 10 is a block diagram illustrating the transmit concept employing the wiring diagram of FIG. 9.
Figure 11:
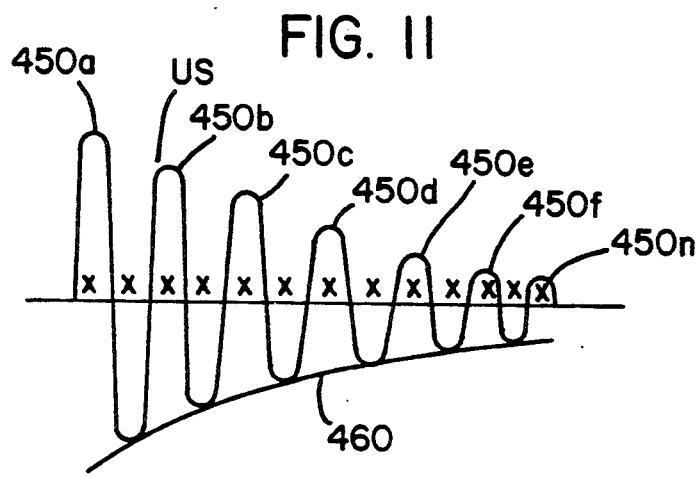
FIG. 11 is a schematic representation of the ultrasonic pulse created by the wiring diagram illustrated in FIG. 9.

FIGS. 8-11 illustrate driving concepts to create the pulses used in system A. In one embodiment, oscillator 400 set to a preselected frequency has a number of sinusoidal cycles transmitted through gate 402 to transducer 404. The transducer has a natural frequency $f_2$. The frequency of oscillator 400 is $f_1$. For good efficiency $f_1$ and $f_2$ must be the same; however, the frequency $f_2$ of transducer 404 varies with temperature. Consequently, the normal circuit for creating pulses of ultrasonic energy for an edge detector as shown in FIG. 1 is somewhat temperature responsive. Consequently, relatively expensive transducers must be employed for maintaining a relatively fixed natural frequency over a large temperature range. Consequently, this arrangement first used in practicing the present invention is not the preferred embodiment and is disclosed for completeness and to teach an equivalent transmit arrangement that can be used to develop pulses for use in the invention. In the preferred embodiment of the invention, the pulses are created by a trigger pulse and ringing of the transmitter. The natural frequency of crystal transducer 22 can vary without drastically affecting the transmitting efficiency of transmitter 20. In this embodiment of the transmitting stage of the invention, pulse transformer 420 is activated by power switch 424. Trigger pulse 200 is applied to line 422 which is the base of the transistor constituting switch 422. This trigger pulse immediately applies a pulse to the primary of transformer 420. This secondary pulse is then applied to transducer 22 for the purpose of ringing the transducer at its natural frequency. Transducer 22 is an X1 CPAX having a natural frequency of generally 180 KHz. A CPAX transducer is a relatively inexpensive transducer for use in system A. Resistor 426 dampens the transducer to reduce the oscillations of the piezoelectric crystal used as transducer 22. This concept is schematically illustrated in FIG. 10 wherein pulse 200 causes transducer 22 to ring. A ring created pulse forms ultrasonic signal US traveling along line P. This ring pulse is schematically illustrated in FIG. 11 wherein oscillations 450a-450n gradually decay as indicated by envelope 460 defined by the individual oscillations of the transmitted pulse from transducer 22. This pulse has a natural frequency determined by the natural frequency of transducer 22 so that the spacing x between the various zero crossings remains nearly constant for the total pulse. In practice, only 6-10 oscillations 450a-450n are received within window W.

Figure 12:
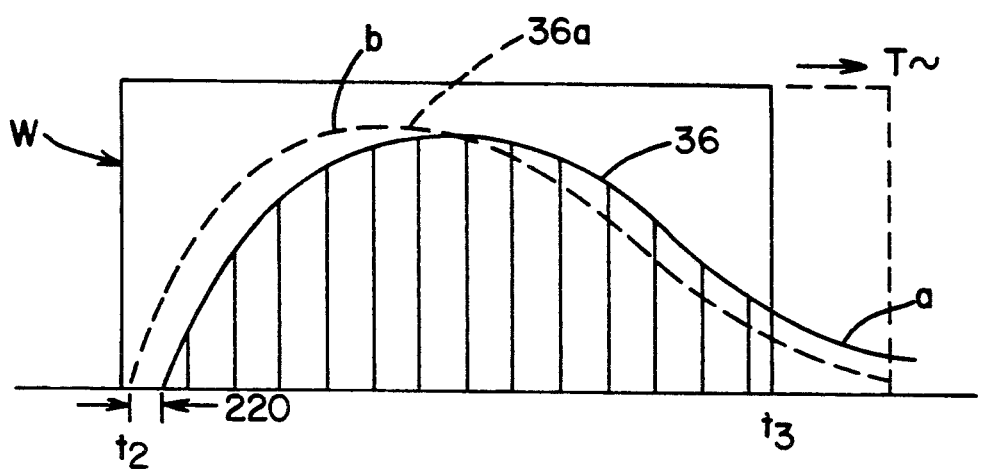
FIG. 12 is a pulse diagram illustrating two features of the preferred embodiment of the present invention which can be employed with either the transmit concept shown in FIG. 8 or the transmit concept shown in FIG. 10; and, FIG. 13 a partial, cross sectional view illustrating the mounting of the thermistor in accordance with one aspect of the present invention.

A further aspect of the present invention is shown in FIG. 12 wherein window W has an increased time-based length as the ambient temperature increases. This can be accomplished by using a thermistor, such as thermistor 300 previously explained. This thermistor could be associated with one shot oscillator 360 as shown in FIG. 7. The $T_3$ logic on lines 364, 366 could be hold for a longer or shorter period of time due to the ambient temperature detected by a thermistor such as thermistor 356 on free running oscillator 350. Thus, a thermistor could be associated with the free running oscillator for changing the delay 202 or with the one shot oscillator 360 to adjust the length of the window. Both of these concepts are within the present invention. Thus, in one embodiment signal 36 in window W is offset the distance 220 and shifted between the solid a line position and the dotted line position b of FIG. 12 as temperature changes. In another embodiment, as temperature changes, window W is changed in length as shown by the dashed lines in FIG. 12. Thus, as the temperature changes, more or less of signal 36 will be within window W. This is accomplished by either a signal 36 position shift 36a or by changing the length of W. Either one of these two features can be employed separately for temperature compensation.

Figure 13:
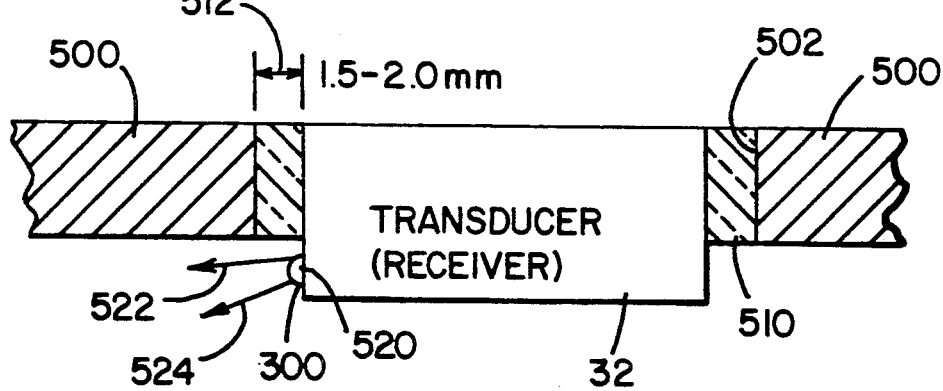

Referring now to FIG. 13, in accordance with another aspect of the present invention the thermistor 300 or the thermistor associated with one shot device 360 which may be thermistor 300 or thermistor 356, is mounted directly upon the receiving transducer 32. Transducer 32 is supported on metal frame 500 at an opening 502. A sleeve of silicon rubber 510 having a spacing 512 holds transducer 32 in place within metal frame 500. Silicon rubber sleeve 510 is used to isolate the acoustic vibration of the transmitting transducer from the frame and it is heat insulation so that the temperature of transducer 32 changes rapidly with the ambient temperature. By placing the thermistor directly on the transducer, lead lines 522, 524 interconnect the thermistor in the circuit as shown in FIG. 6 for the purposes of controlling the gain of the preamplifier stage in accordance with the ambient temperature between transducers 22, 32. In this manner, the ambient temperature employed for the thermistor in FIG. 6 is closely associated with the actual ambient temperature experienced by system A. This arrangement has produced a drift of 0.06% /°C. when using the concept discussed with respect to FIG. 6 as the temperature compensation for the system A. This is the preferred arrangement; however, in other embodiments the window is offset and/or the window is changed in length by a thermistor arrangement mounted directly on transducer 32.

The offset 220 can be in the general range of 10-30 microseconds; however, the preferred offset is 20 microseconds at about 25° C. Window W is changed in length as a direct relationship with the ambient temperature. The thermistor when used for this purpose must be connected to have a direct relationship so that increased temperature increases the length of window W.

Having thus defined the invention, the following is claimed:

1. A system for creating a control signal having a value indicative of the position of the lateral edge of a moving web, said system comprising: means for creating a succession of ultrasonic pulses from a transmitter, each of said pulses being created at a known transmit time in response to a transmit signal, each of said pulses having a number of oscillations defining a pulse envelope having a pulse start position; means for directing each of said pulses toward an ultrasonic receiver along a selected path whereby the position of said lateral edge in said path determines the energy of each of said pulses as each pulse is received by said receiver; means for converting each received pulse into an electrical signal having an amplitude determined by the energy of the received pulse; means for spacing said receiver from said transmitter a distance causing each of said pulses to be received by said receiver at a given time after said transmit signal for a given ambient temperature; means for creating a logic window having a given time-based length and occurring at a set time after said transmit signal, said set time being slightly less than said given time whereby each of said electrical signals occur at an offset time in said logic window at said given ambient temperature; and, means for controlling the value of said control signal by the amplitude of said electrical signal.

2. A system as defined in claim 1 wherein said offset time is 10-30 microseconds.

3. A system as defined in claim 1 wherein said offset time is about 20 microseconds at about 25° C.

4. A system as defined in claim 2 wherein means for creating a succession of ultrasonic pulses comprises a transmitter having a natural frequency, and pulse means for applying a short electrical pulse to said transmitter whereby said transmitter rings at said natural frequency to create said ultrasonic pulse.

5. A system as defined in claim 4 including means for damping said transmitter to reduce said transmitted ultrasonic oscillations.

6. A system as defined in claim 1 wherein means for creating a succession of ultrasonic pulses comprises a transmitter having a natural frequency, and pulse means for applying a short electrical pulse to said transmitter whereby said transmitter rings at said natural frequency to create said ultrasonic pulse.

7. A system as defined in claim 6 including means for damping said transmitter to reduce said transmitted ultrasonic oscillations.

8. A system as defined in claim 6 including means for changing in a direct relationship said time-based length for said window as said ambient temperature changes.

9. A system as defined in claim 8 wherein said length changing means includes a thermistor adjacent said receiver and means for changing said length in response to the resistance of said thermistor.

10. A system as defined in claim 1 including means for changing in a direct relationship said time-based length of said window as said ambient temperature changes.

11. A system as defined in claim 10 wherein said length changing means includes a thermistor adjacent said receiver and means for changing said length in response to the resistance of said thermistor.

12. A system for creating a control signal having a value indicative of the position of the lateral edge of a moving web, said system comprising: means for creating a succession of ultrasonic pulses from a transmitter, each of said pulses being created at a known transmit time in response to a transmit signal, each of said pulses having a number of oscillations defining a pulse envelope having a pulse start position; means for directing each of said pulses toward an ultrasonic receiver along a selected path whereby the position of said lateral edge in said path determines the energy of each of said pulses as each pulse is received by said receiver; means for converting each received pulse into an electrical signal having an amplitude determined by the energy of the received pulse; means for spacing said receiver from said transmitter a distance causing each of said pulses to be received by said receiver at a given time after said transmit signal for a given ambient temperature; means for creating a logic window having a given time-based length; means for changing in a direct relationship said time-based length of said window as said ambient temperature changes; and, means for controlling the value of said control signal by the amplitude of said electrical signal.

13. A system as defined in claim 12 wherein said length changing means includes a thermistor adjacent said receiver and means for changing said length in response to the resistance of said thermistor.

14. A system as defined in claim 13 wherein means for creating a succession of ultrasonic pulses comprises a transmitter having a natural frequency, and pulse means for applying a short electrical pulse to said transmitter whereby said transmitter rings at said natural frequency to create said ultrasonic pulse.

15. A system as defined in claim 14 including means for damping said transmitter to reduce said transmitting ultrasonic oscillations.

16. A system for creating a control signal having a value indicative of the position of the lateral edge of a moving web, said system comprising: means for creating a succession of ultrasonic pulses from a transmitter, each of said pulses being created at a known transmit time in response to a transmit signal, each of said pulses having a number of oscillations defining a pulse envelope having a pulse start position; means for directing each of said pulses toward an ultrasonic receiver along a selected path whereby the position of said lateral edge in said path determines the energy of each of said pulses as each pulse is received by said receiver; means for converting each received pulse into an electrical signal having an amplitude determined by the energy of the received pulse; means for spacing said receiver from said transmitter a distance causing each of said pulses to be received by said receiver at a given time after said transmit signal for a given ambient temperature; means for creating a logic window having a given time-based length; means for amplifying said electrical signal with a selected gain; means for changing in a direct relationship said gain as said ambient temperature changes, said gain changing means viewing a thermistor mounted onto said receiver; and, means for controlling the value of said control signal by the amplitude of said electrical signal.

17. A system as defined in claim 16 wherein means for creating a succession of ultrasonic pulses comprises a transmitter having a natural frequency, and pulse means for applying a short electrical pulse to said transmitter whereby said transmitter rings at said natural frequency to create said ultrasonic pulse.

18. A system as defined in claim 17 including means for damping said transmitter to reduce said transmitted ultrasonic oscillations.

19. A system as defined in claim 17 wherein said receiver has a surrounding metal housing and means for mounting said thermistor directly onto said housing.

20. A system as defined in claim 19 including an acoustical, thermal isolation layer around said housing and means for mounting said receiver in a plate opening surrounding said insulation layer.

21. A system as defined in claim 16 wherein said receiver has a surrounding metal housing and means for mounting said thermistor directly onto said housing.

22. A system as defined in claim 21 including an acoustical, thermal isolation layer around said housing and means for mounting said receiver in a plate opening surrounding said insulation layer.

23. A system as defined in claim 9 wherein said receiver has a surrounding metal housing and means for mounting said thermistor directly onto said housing.

24. A system as defined in claim 11 wherein said receiver has a surrounding metal housing and means for mounting said thermistor directly onto said housing.

25. A method of creating a control signal having a value indicative of the position of the lateral edge of a moving web, said method comprising the steps of:
 (a) creating a succession of ultrasonic pulses from a transmitter, each of said pulses being created at a known transmit time in response to a transmit signal, each of said pulses having a number of oscillations defining a pulse envelope having a pulse start portion;
 (b) spacing said receiver from said transmitter a distance causing each of said pulses to be received by said receiver at a given time after said transmit signal for a given ambient temperature;
 (c) directing each of said pulses toward an ultrasonic receiver along a selected path whereby the position of said lateral edge in said path determines the energy of each of said pulses as each pulse is received by said receiver;
 (d) converting each received pulse into an electrical signal having an amplitude determined by the energy of the received pulse;
 (e) creating a logic window having a given time-based length and occurring at a set time after said transmit signal, said set time being slightly less than said given time whereby each of said electrical signals occur at an offset time in said logic window at said given ambient temperature; and,
 (f) controlling the value of said control signal by the amplitude of said electrical signal.

26. A method of creating a control signal having a value indicative of the position of the lateral edge of a moving web, said method comprising the steps of:
 (a) creating a succession of ultrasonic pulses from a transmitter, each of said pulses being created at a known transmit time in response to a transmit signal, each of said pulses having a number of oscillations defining a pulse envelope having a pulse start portion;
 (b) spacing said receiver from said transmitter a distance causing each of said pulses to be received by said receiver at a given time after said transmit signal for a given ambient temperature;
 (c) directing each of said pulses toward an ultrasonic receiver along a selected path whereby the position of said lateral edge in said path determines the energy of each of said pulses as each pulse is received by said receiver;
 (d) converting each received pulse into an electrical signal having an amplitude determined by the energy of the received pulse;
 (e) creating a logic window having a given time-based length;
 (f) changing in a direct relationship said time-based length of said window as said ambient temperature changes; and,
 (g) controlling the value of said control signal by the amplitude of said electrical signal.

27. A method of creating a control signal having a value indicative of the position of the lateral edge of a moving web, said method comprising the steps of:
 (a) creating a succession of ultrasonic pulses from a transmitter, each of said pulses being created at a known transmit time in response to a transmit signal, each of said pulses having a number of oscillations defining a pulse envelope having a pulse start portion;
 (b) spacing said receiver from said transmitter a distance causing each of said pulses to be received by said receiver at a given time after said transmit signal for a given ambient temperature;
 (c) directing each of said pulses toward an ultrasonic receiver along a selected path whereby the position of said lateral edge in said path determines the energy of each of said pulses as each pulse is received by said receiver;
 (d) converting each received pulse into an electrical signal having an amplitude determined by the energy of the received pulse;
 (e) creating a logic window having a given time-based length;
 (f) amplifying said electrical signal with a selected gain;
 (g) changing in a direct relationship said gain as said ambient temperature changes, said gain changing step being accomplished by a thermistor mounted directly onto said receiver; and,
 (h) controlling the value of said control signal by the amplitude of said electrical signal.

28. A method of creating a control signal having a value indicative of the position of the lateral edge of a moving web, said method comprising the steps of:
 (a) creating a succession of ultrasonic pulses from a transmitter, each of said pulses being created at a known transmit time in response to a short transmit pulse to ring said transmitter at its natural frequency, each of said pulses having a number of oscillations defining a pulse envelope having a pulse start portion and a decaying following portion;
 (b) spacing said receiver from said transmitter a distance causing each of said pulses to be received by said receiver at a given time after said transmit signal for a given ambient temperature;

(c) directing said ring created pulses toward an ultrasonic receiver along a selected path whereby the position of said lateral edge in said path determines the energy of each of said pulses as each pulse is received by said receiver;

(d) converting each received ring created pulse into a electrical signal having an amplitude determined by the energy of the received pulse;

(e) creating a logic window having a given time-based length whereby said electrical signals occur in said logic windows; and, (f) controlling the value of said control signal by the amplitude of said electrical signal.

29. A method as defined in claim 28 including the additional step of changing the length of said logic window as a direct relationship of changes in said ambient temperature.

30. A method as defined in claim 28 including the additional step of changing the number of oscillations of said pulses in said window as a function of said ambient temperature.

31. A method as defined in claim 28 including the following additional steps:

(g) amplifying said electrical signal with a selected gain;

(h) changing in a direct relationship said gain as said ambient temperature changes, said gain changing step being accomplished by a thermistor mounted directly onto said receiver.

32. A system for creating a control signal having a value indicative of the position of the lateral edge of a moving web, said system comprising: means for creating a succession of ultrasonic pulses from a transmitter, each of said pulses being created at a known transmit time in response to a short transmit pulse to ring said transmitter at its natural frequency, each of said pulses having a number of oscillations defining a pulse envelope having a pulse start portion and a decaying following portion; means for directing said ring created pulses toward an ultrasonic receiver along a selected path whereby the position of said lateral edge in said path determines the energy of each of said pulses as each pulse is received by each receiver; means for converting said received ring created pulse into an electrical signal having an amplitude determined by the energy of the received pulse; means for spacing said receiver from said transmitter a distance causing each of said pulses to be received by said receiver at a given time after said transmit signal for a given ambient temperatures; means for creating a logic window having a given time-based length whereby each of said electrical signals occur in a logic window and means for controlling the value of said control signal by the amplitude of said electrical signal.

33. System for creating a control signal having a value indicative of the position of the lateral edge of a moving web, said system comprising: means for creating a succession of ultrasonic pulses from a transmitter, each of said pulses being created at a known transmit time in response to a transmit signal, each of said pulses having a number of oscillations; means for directing each of said pulses toward an ultrasonic receiver along a selected path whereby the position of said lateral edge in said path determines the energy of each of said pulses as each pulse is received by said receiver; means for converting each received pulse into an electrical signal having an amplitude determined by the energy of the received pulse; means for spacing said receiver from said transmitter a distance causing each of said pulses to be received by said receiver at a given time after said transmit signal for a given ambient temperature; means for creating a logic window having a given time-based length and occurring at a set time after said transmit signal; means for passing said electrical signal only during said window; means for integrating said electrical signals occurring at said windows to create a representation of the energy of each of said pulses and, means for controlling the value of said control signal by said representation.

34. A system as defined in claim 22 including means for adjusting said set time in response to changes in the ambient temperature.

* * * * *